(12) United States Patent
Chun et al.

(10) Patent No.: US 8,531,999 B2
(45) Date of Patent: Sep. 10, 2013

(54) METHOD OF COMMUNICATION SUPPORTING HALF-DUPLEX FREQUENCY DIVISION DUPLEX

(75) Inventors: Jin Young Chun, Anyang-si (KR); Bin Chul Ihm, Anyang-si (KR); Jin Sam Kwak, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 502 days.

(21) Appl. No.: 12/680,111

(22) PCT Filed: Oct. 20, 2008

(86) PCT No.: PCT/KR2008/006188
§ 371 (c)(1),
(2), (4) Date: Mar. 25, 2010

(87) PCT Pub. No.: WO2009/051455
PCT Pub. Date: Apr. 23, 2009

(65) Prior Publication Data
US 2010/0195546 A1    Aug. 5, 2010

Related U.S. Application Data

(60) Provisional application No. 60/981,102, filed on Oct. 18, 2007, provisional application No. 60/981,516, filed on Oct. 21, 2007, provisional application No. 60/982,111, filed on Oct. 23, 2007.

(30) Foreign Application Priority Data

Mar. 10, 2008   (KR) .................. 10-2008-0021793

(51) Int. Cl.
*H04J 1/00*    (2006.01)
(52) U.S. Cl.
USPC .......................................... 370/281; 370/328
(58) Field of Classification Search
USPC ................................................. 370/281, 328
See application file for complete search history.

(56) References Cited

U.S. PATENT DOCUMENTS

| | | | |
|---|---|---|---|
| 2006/0029011 A1* | 2/2006 | Etemad et al. | 370/311 |
| 2006/0098568 A1 | 5/2006 | Oh et al. | |
| 2006/0135169 A1 | 6/2006 | Sampath et al. | |
| 2006/0171295 A1 | 8/2006 | Ihm et al. | |

(Continued)

FOREIGN PATENT DOCUMENTS

| | | | |
|---|---|---|---|
| WO | WO 2007/108624 A2 | 9/2007 | |
| WO | WO 2007/112371 A1 | 10/2007 | |

OTHER PUBLICATIONS

Huawei: "Bandwidth efficient UL L1/L2 control messages", 3GPP Draft; R1-071419, 3rd Generation Partnership Project (3GPP), Mobile Competence Centre; 650, Route Des Lucioles; F-06921 Sophia-Antipolis Cedex; France, vol. RAN WG1, no. St. Julian; Apr. 3, 2007, XP050105361.

(Continued)

*Primary Examiner* — Sai-Ming Chan
(74) *Attorney, Agent, or Firm* — McKenna Long & Aldridge LLP

(57) ABSTRACT

A communication supporting half-duplex frequency division duplex and receiving a broadcast message. A control signal for a broadcast message is received and decoded partially or entirely according to an indication bit included in the control signal.

14 Claims, 13 Drawing Sheets

(56) References Cited

U.S. PATENT DOCUMENTS

| | | |
|---|---|---|
| 2006/0171417 A1 | 8/2006 | Ihm et al. |
| 2007/0171864 A1 | 7/2007 | Zhang et al. |
| 2007/0211657 A1 | 9/2007 | McBeath et al. |
| 2007/0223440 A1 | 9/2007 | Ho et al. |
| 2007/0242770 A1 | 10/2007 | Kim et al. |
| 2007/0248046 A1 | 10/2007 | Khan |
| 2009/0092066 A1* | 4/2009 | Chindapol et al. ............ 370/277 |
| 2009/0092067 A1* | 4/2009 | Sudarshan et al. ............ 370/281 |
| 2009/0122884 A1 | 5/2009 | Vook et al. |
| 2009/0154588 A1 | 6/2009 | Chen et al. |
| 2009/0219865 A1 | 9/2009 | Salzer et al. |
| 2009/0258653 A1* | 10/2009 | Helvick ........................ 455/450 |

OTHER PUBLICATIONS

"IEEE Standard for Local and Metropolitan Area Networks Part 16: Air Interface for Fixed and Mobile Broadband Wireless Access Systems Amendment 2: Physical and Medium Access Control Layers for Combined Fixed and Mobile Operation in Licensed Bands and Corrigendun 1; IEEE Std 802.16e-2005 and IEEE STD 8", 802.16E-2005 and IEEE Std 802.16-2004/COR1-2005 IEEE Standard for Local and Metropolitan Area Networks Part 16: Air Interface for Fixed and Mobile Broadband Wireless Access Systems Amendment 2: Physical and Medium Access Control Layers for Combined F, Jan. 1, 2006, pp. 1-822, XP017603857.

Huawei: "Overhead reduction of Best-M based CQI reporting", 3GPP Draft; R1-063086, $3^{rd}$ Generation Partnership Project (3GPP), Mobile Competence Centre; 650, Route Des Lucioles; F-06921 Sophia-Antipolis Cedex; France, vol. RAN WG1, no. Riga, Latvia; Nov. 1, 2006, XP050103545.

Huawei: "Uplink overhead for CQI and MIMO feedback in E-UTRA", 3GPP Draft; R1-071418, $3^{rd}$ Generation Partnership Project (3GPP), Mobile Competence Centre; 650, Route Des Lucioles; F-06921 Sophia-Antipolis Cedex; France, vol. RAN WG1, no. St. Julian; Apr. 3, 2007, XP050105360.

* cited by examiner

METHOD OF COMMUNICATION SUPPORTING HALF-DUPLEX FREQUENCY DIVISION DUPLEX

This application is a 35 U.S.C. §371 National Stage entry of International Application No. PCT/KR2008/006188, filed on Oct. 20, 2008, and claims priority to U.S. Provisional Application Ser. Nos. 60/981,102, filed Oct. 18, 2007, 60/981,516, filed Oct. 21, 2007, and 60/982,111, filed Oct. 23, 2007, and Korean Application No. 10-2008-0021793, filed on Mar. 10, 2008, each of which is hereby incorporated by reference in its entirety as if fully set forth herein.

TECHNICAL FIELD

The present invention relates to a wireless communication system, and more particularly, to a method of communication supporting half-duplex frequency division duplex (H-FDD).

BACKGROUND ART

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'.

A communication channel between a base station (BS) and a mobile station (MS) includes a downlink (DL) channel directed from the BS to the MS and an uplink (UL) channel directed from the MS to the BS.

A system profile based on the conventional IEEE 802.16 standard supports only time division duplex (TDD) mode. In TDD mode, UL transmission and DL transmission are performed at different time while occupying the same frequency band. Advantageously, TDD mode provides simple frequency selective scheduling since a UL channel property and a DL channel property are almost reciprocal.

There is an attempt to introduce frequency division duplex (FDD) and/or half-duplex FDD (H-FDD) mode in the IEEE 802.16 standard. In FDD mode, UL transmission and DL transmission are simultaneously performed while occupying different frequency bands. In H-FDD mode, UL transmission and DL transmission cannot be simultaneously performed while occupying different frequency bands. That is, in H-FDD mode, UL transmission and DL transmission are performed in different frequency bands at different time. Therefore, in H-FDD mode, the BS must not allocate a UL bandwidth during a time period in which the MS receives DL data.

A broadcast message configuration method, a resource allocation method, a MAP message configuration method, and the like used in FDD/H-FDD mode are different from those used in TDD mode. Accordingly, a frame structure for effectively implementing FDD/H-FDD mode is required. In addition, there is a need for a method of effectively receiving and/or transmitting data by using the frame structure.

DISCLOSURE OF INVENTION

Technical Problem

The present invention provides a method of effective communication supporting half-duplex FDD (H-FDD).

Technical Solution

In one aspect, a method of communication supporting half-duplex frequency division duplex (H-FDD) in which a downlink subframe and an uplink subframe are allocated in different frequency bands at different time is provided. The method includes receiving a group switching indicator, wherein the group switching indicator indicates switching among a plurality of groups, and the plurality of group use different downlink subframes in time domain and switching to the group indicated by the group switching indicator.

In another aspect, a mobile station (MS) supporting H-FDD in which a downlink subframe and an uplink subframe are allocated in different frequency bands at different time is provided. The MS includes a radio frequency (RF) unit for transmitting and receiving a radio signal and a processor coupled with the RF unit and configured to receive a group switching indicator which indicates switching between a first group and a second group and switch one of the first group and the second group indicated by the group switching indicator, wherein the first group uses a first downlink subframe and a first uplink subframe in a frame, the second group uses a second downlink subframe and a second uplink subframe in the frame, the frame comprises the first downlink subframe, the second downlink subframe, the first uplink subframe and the second subframe, the first downlink subframe and the second downlink subframe uses different frequency bands from the first uplink subframe and the second uplink subframe, the first downlink subframe is not overlapped with the first uplink subframe, and the second downlink subframe is not overlapped with the second uplink subframe.

Advantageous Effects

The frame structure for effectively implementing H-FDD mode is provided.

MODE FOR THE INVENTION

Figure 1:
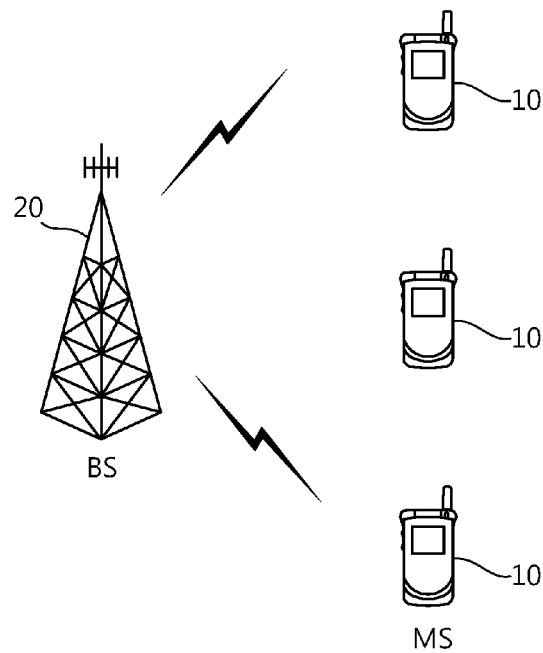
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one mobile station (MS) 10 and a base station (BS) 20. The MS10 may be fixed or mobile, and may be referred to as another terminology, such as a user equipment (UE), a user terminal (UT), a subscriber station (SS), a wireless device, etc. The BS 20 is generally a fixed station that communicates with the MS10 and may be referred to as another terminology, such as a node-B, a base transceiver system (BTS), an access point, etc. There are one or more cells within the coverage of the BS 20.

A downlink (DL) represents a communication link from the BS 20 to the MS10, and an uplink (UL) represents a communication link from the MS10 to the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers.

Hereinafter, a slot is a minimum unit of possible data allocation, and is defined with a time and a subchannel. The number of subchannels depends on an FFT size and time-frequency mapping. Each subchannel includes a plurality of subcarriers. The number of subcarriers included in each subchannel differs according to a permutation scheme. Permutation denotes mapping from a logical subchannel to a physical subcarrier.

Figure 2:
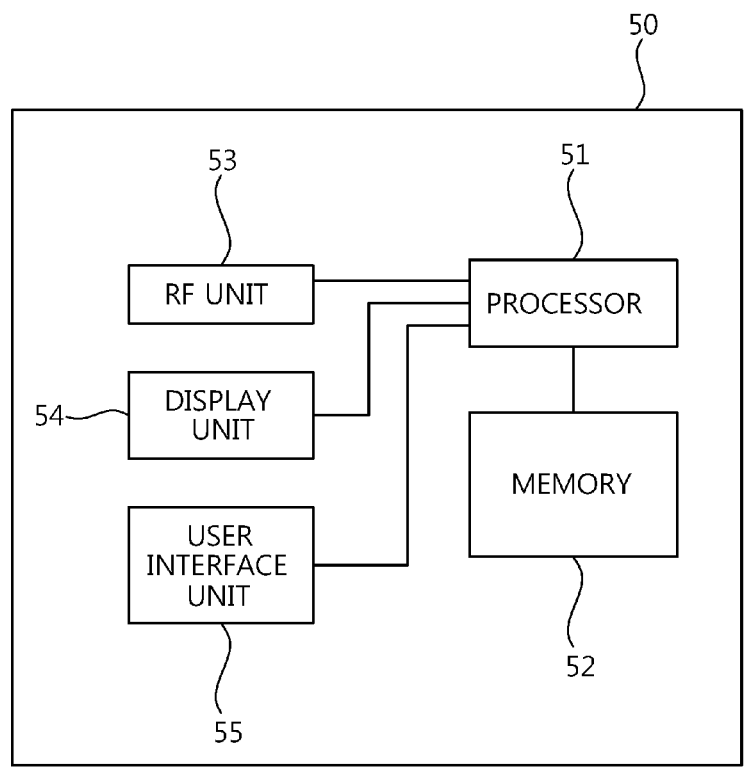
FIG. 2 is a block diagram showing constitutional elements of a mobile station (MS).

FIG. 2 is a block diagram showing constitutional elements of an MS.

Referring to FIG. 2, an MS 50 includes a processor 51, a memory 52, a radio frequency (RF) unit 53, a display unit 54, and a user interface unit 55. The processor 51 serves to transmit and receive data of a physical layer or a medium access control (MAC) layer. A data communication method to be described below can be implemented in the processor 51. The memory 52 is coupled to the processor 51 and stores an operating system, applications, and general files. The display unit 54 displays a variety of information of the MS 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Figure 3:
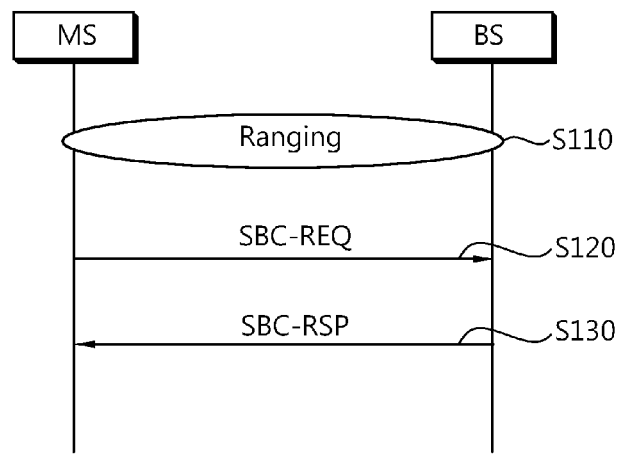
FIG. 3 is a flow diagram showing a method using frequency division duplex (FDD) and/or half-duplex FDD (H-FDD) mode.

FIG. 3 is a flow diagram showing a method using FDD or H-FDD mode.

Referring to FIG. 3, ranging is performed between a BS and an MS (step S110). This is an initial ranging process which acquires an exact timing offset between the BS and the MS and regulates initial transmission power.

The MS transmits an SS-basic capability request (SBC-REQ) message to the BS (step S120). The SBC-REQ message includes information regarding capability that can be supported by the MS for effective communication between the MS and the BS. Further, the SBC-REQ message includes 'bandwidth allocation support' information and 'physical parameter supported' information. The 'bandwidth allocation support' information specifies an MS characteristic which needs to be known to the BS for bandwidth allocation.

Table 1 shows an example the 'bandwidth allocation support' information.

TABLE 1

| Bit | Description |
| --- | --- |
| #0 | Reserved; shall be set to zero |
| #1 | Bit #1 = 0: H-FDD |
|  | Bit #1 = 1: FDD |
| #2~7 | Reserved; shall be set to zero |

If the value of Bit#1 is '0', the MS supports the H-FDD. If the value of Bit#1 is '1', the MS supports the FDD.

The BS transmits an SS-basic capabilities response (SBC-RSP) message to the MS (step 130). The SBC-RSP message is a response for the SBC-REQ message and indicates capability to be applied to communication between the MS and the BS. Capability negotiation between the MS and the BS is performed by using the SBC-REQ message and the SBC-RSP message. When a certain function can be supported by the MS through the SBC-REQ message, the BS transmits the SBC-RSP message as a response. The function negotiated through the SBC-REQ message and the SBC-RSP message is used in communication between the MS and the BS. For example, when the H-FDD is negotiated through the SBC-REQ/SBC-RSP, the MS and the BS communicate using H-FDD mode. Alternatively, when the FDD is negotiated through the SBC-REQ/SBC-RSP, the MS and the BS communicate using FDD mode.

Figure 4:
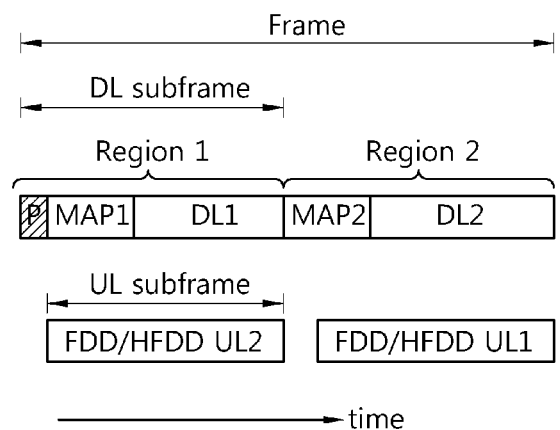
FIG. 4 shows an exemplary structure of an FDD/H-FDD frame.

FIG. 4 shows an exemplary structure of an FDD/H-FDD frame.

Referring to FIG. 4, the frame includes a preamble (indicated by P), two DL subframes, and two UL subframes. The DL subframes and the UL subframes use different frequency bands. The first downlink subframe is not overlapped with the first uplink subframe, and the second downlink subframe is not overlapped with the second uplink subframe. Although two DL subframes and two UL subframes are shown in FIG. 4, the number of subframes is not limited thereto.

There is no limit in a length of the frame. The frame may have a length of 5 milliseconds (ms), 2.5 ms, or 1.25 ms. The location or number of preambles in the frame may vary. Only one preamble may exist in a first portion of the frame. One more preamble may also exist in front of a second DL subframe. Each of a plurality of frames may include one preamble. The DL subframe includes a MAP and a DL burst. The UL subframe includes a UL burst. The MAP includes a DL-MAP and a UL-MAP.

There is no limit in a MAP type. Examples of the MAP type include a compressed MAP, a sub-MAP, a hybrid automatic repeat request (HARM) MAP, etc. The DL burst is a region for transmitting data to be sent by a BS to an MS. The UL burst is a region for transmitting data to be sent by the MS to the BS.

The preamble is used between the BS and the MS for initial synchronization, cell search, and frequency offset and channel estimation. A frame control header (FCH) can be located between the preamble and the MAP. The FCH is a region for transmitting a DL frame prefix. The DL frame prefix includes a length of a DL-MAP message and coding scheme information of the DL-MAP.

The DL-MAP is a region for transmitting the DL-MAP message. The DL-MAP message defines access to a DL channel. This implies that the DL-MAP message defines DL channel indication and/or control information.

The UL-MAP is a region for transmitting a UL-MAP message. The UL-MAP message defines access to a UL channel. This implies that the UL-MAP message defines UL channel indication and/or control information.

Hereinafter, two DL subframes included in one frame are sequentially referred to as a region 1 and a region 2.

The region 1 includes a MAP1 and a first DL burst (DL1). A second UL burst (UL2) is present during the same time period as the region 1. The region 2 includes a MAP2 and a second DL burst (DL2). A first UL burst (UL1) is present during the time period as the region 2. The region 2 may be present at a location defined in a time domain of the frame. For example, if the frame has a size of 5 ms, the MAP2 may always start at 2.5 ms.

In case of using FDD mode, the MS can transmit the UL subframe while at the same time receiving the DL subframe. However, since the UL subframe cannot be transmitted while the MS receives the DL subframe in H-FDD mode, there is a need for a method of allocating DL and UL subframes to an MS. Examples of the allocation method include an MS grouping method and a method of performing allocation by a BS for each DL subframe.

The MS grouping method will now be described as the method of allocating DL and UL subframes to an MS.

MS grouping is a process in which radio resources are allocated by grouping MSs within a cell when the MSs use H-FDD mode. In this case, each MS operates in its group. The DL subframe and the UL subframe that can be used by an MS vary in the frame according to a group where the MS belongs. The MS grouping may be arbitrarily determined by a BS and then may be reported to the MSs. The MS grouping may be determined by the MSs and then may be achieved when the MSs request the BS to perform MS grouping. Examples of an MS grouping criterion include an amount of radio resources required by each MS, an availability of a multicast and broadcast service (MBS), an MBS type, etc.

As an example of the MS grouping method, a method in which MSs are grouped into two groups will be described. However, the number of groups is not limited to two. It is assumed that a frame includes two DL subframes, and MSs are grouped into two groups, i.e., a group 1 and a group 2. MSs belonging to the group 1 use a region 1, which includes a MAP1 and a DL1, as a DL subframe and also use a UL1 as a UL subframe. MSs belonging to the group 2 use a region 2, which includes a MAP2 and a DL2, as a DL subframe and also use a UL2 as a UL subframe. Therefore, while the MSs belonging to the group 1 receive DL data through the region 1, the MSs belonging to the group 2 can transmit UL data through the UL2 existing in another frequency band. On the contrary, while the MSs belonging to the group 2 receive DL data through the region 2, the MSs belonging to the group 1 can transmit UL data through the UL1 existing in another frequency band.

A group where an MS belongs may be determined by the BS or may be determined according to a preliminary rule between the BS and the MS. The BS may inform the MS of a group where the MS belongs by using a message such as a group switching indicator, or may switch the MS group. Alternatively, the BS may implicitly inform the MS of the group where the MS belongs by using allocated radio resource, or may allow switch of the MS group. The BS transmits DL data through a DL subframe used by the group where the MS belongs.

Figure 5:
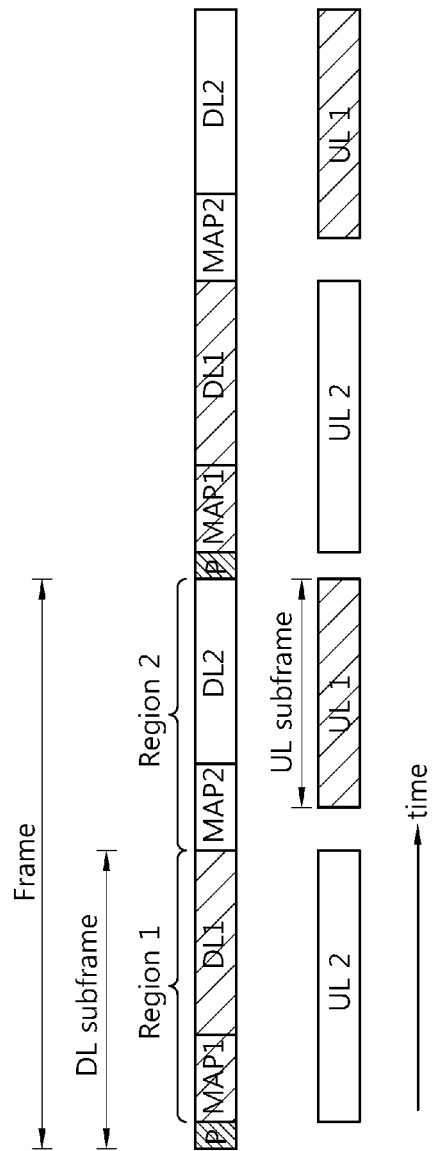
FIG. 5 shows an example of an operation of an MS belonging to a group 1 through MS grouping in H-FDD mode.

FIG. 5 shows an example of an operation of an MS belonging to a group 1 through MS grouping in H-FDD mode.

Referring to FIG. 5, when the MS powers on or performs a handover (HO), the MS detects a preamble from a received message, and reads a MAP1 to determine whether DL data to be received by the MS exists in a first DL burst (DL1). If there is no group switching indicator for a group 2 or if there is DL data or UL allocation, the MS belongs to the group 1. Thereafter, the MS communicates with a BS through DL and UL subframes allocated to the group 1.

Figure 6:
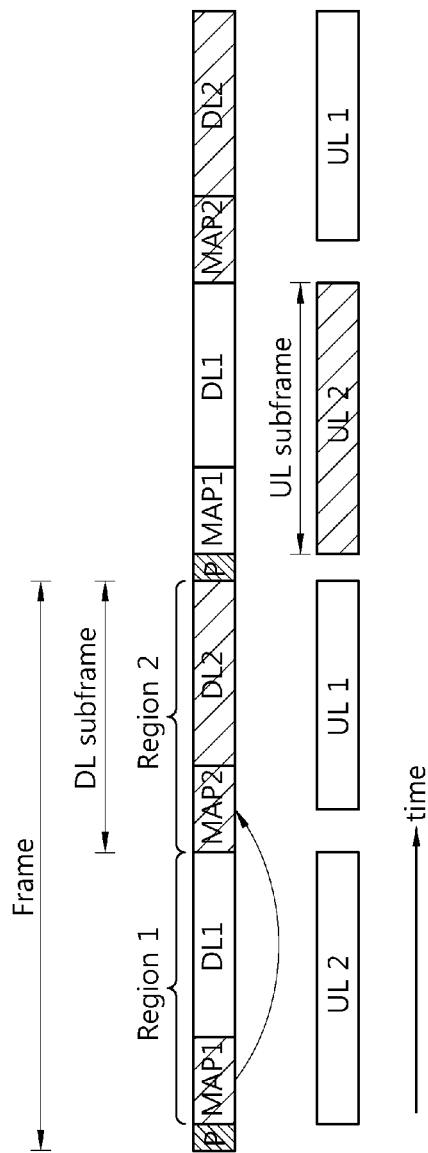
FIG. 6 shows an example of an operation of an MS belonging to a group 2 through MS grouping in H-FDD mode.

FIG. 6 shows an example of an operation of an MS belonging to a group 2 through MS grouping in H-FDD mode.

Referring to FIG. 6, when the MS powers on or performs a handover (HO), the MS detects a preamble from a received message, and reads a MAP1 to determine whether DL data to be received by the MS exists in a first DL burst (DL1). If there is no DL data or UL allocation, the MS reads a MAP2 to determine whether the DL data to be received by the MS exists in a second DL burst (DL2). If there is DL data, the MS belongs to the group 2. Alternatively, after receiving a group switching indicator for the group 2, the MS communicates with the BS through DL and UL subframes allocated to the group 2.

A multicast and broadcast service (MBS) is a service in which the BS transmits a broadcast message or a multicast message to a plurality of MSs. AN MS of one group cannot read DL data of another group while the MS transmits UL data. However, when the BS transmits an MBS message to another group, there is a problem in that an MS using the MBS cannot receive the MBS message. Therefore, if the BS has the MBS message to be transmitted to the MS, the BS has to repeatedly transmit the MBS message to each of the region 1 and the region 2.

Repetitive transmission of the MBS message results in an overhead. To avoid the overhead, MSs using the MBS can be scheduled to the same group by the BS. For example, if the all MSs using the MBS belong to the group 1, the BS transmits the MBS message only to the region 1. Alternatively, the MSs may be grouped according to a type of the MBS used by the MSs. For example, MSs using one type of the MBS are scheduled to the group 1, and MSs using another type of the MBS are scheduled to the group 2.

An MS operating in a specific group may have to switch its group so as to effectively communicate with the BS. For example, in a case where MSs using the MBS are grouped into the group 1, an MS belonging to the group 2 has to switch its group to the group 2 so as to use the MBS. As such, if the BS has to determine switch of MS group from one group to another or if the MS has to switch its group, the BS can transmit a group switching indicator to the MS.

Table 2 below shows an example of a group switching message which includes the group switching indicator. Although an HARQ and sub-MAP pointer is used as the group switching message, a format of the group switching message is not limited thereto.

TABLE 2

| Syntax | Size (bit) | Notes |
| --- | --- | --- |
| HARQ_and_Sub-MAP Pointer IE( ){ | | |
| Extended DIUC | | HARQ P = 0x07 |
| MAP Version | 2 | 0b00: HARQ MAPv1 |
| | | 0b01: Submap |
| | | 0b10: Submap with CID mask included |
| | | 0b11: group switch in H-FDD |
| If(MAP Version ==0b11){ | | |
| Num of CID | variable | The number of CID for group switching |
| For(i=0; i<Num of CID; i++){ | | |
| CID | 16 | If CID is included, the user shall move to other group. |
| } | | |
| } | | |
| } | | |

An HARQ and sub-MAP pointer message may include an extended downlink interval usage code (DIUC), a MAP version, etc. The extended DIUC has a value for indicating the HARQ and sub-MAP pointer message. The MAP version indicates an HARQ MAP version.

If the MAP version is '0b11', it can be used as the group switching message. The group switching message may include the number of connection identifiers (CIDs) for group switching and may also include each CID. Instead of each CID, the group switching message may include a reduced CID (RCID). The MS switches its group in the presence of the CID or the RCID. For example, an MS belonging to the group 1 is switched to the group 2, and an MS belonging to the group 2 is switched to the group 1.

Table 3 below shows another example of the group switching message. A DL-MAP extended message is used as an H-FDD switch pointer message.

TABLE 3

| Syntax | Size (bit) | Notes |
| --- | --- | --- |
| H-FDD Switch Pointer IE( ){ | | |
| Extended DIUC | | 0x05, 0x06, 0x09-10 or 0x0D-0E |
| Num of CID | variable | The number of CID for group switching |
| For(i=0; i<Num of CID; i++){ | | |
| CID | 16 | If CID is included, the user shall move to other group. |
| } | | |
| } | | |

Upon receiving the group switching message, the MS performs group switching as indicated by the group switching message. Starting from an immediately subsequent frame (or a second subsequent frame), the MS may be switched to another group. Then, the MS operates in a new group to communicate with the BS.

The method of performing allocation by a BS for each DL subframe will now be described as the method of allocating DL and UL subframes to an MS.

Figure 7:
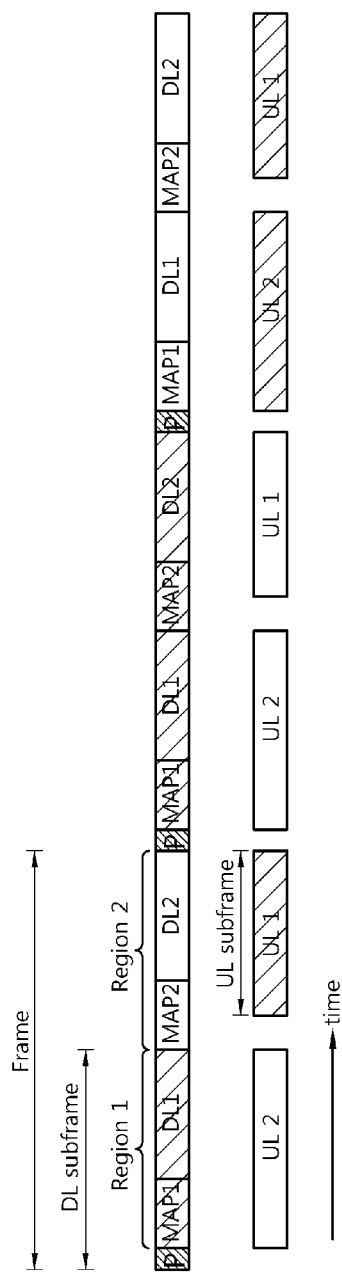
FIG. 7 shows an example of a frame structure for H-FDD mode.

FIG. 7 shows an example of a frame structure for H-FDD mode.

Referring to FIG. 7, for each DL subframe, a BS schedules regions to be used by an MS. Since H-FDD mode is used, the BS has to perform scheduling so that DL reception and UL transmission are not simultaneously performed by the MS. That is, the BS does not allocate DL subframes and UL subframes to the MS at the same time. The DL subframes may be continuously allocated to the MS. Since the BS performs scheduling for each DL subframe, there is no need to group MSs within a cell when the MSs use H-FDD mode as in the case of the MS grouping method.

The BS may continuously or discontinuously allocate the UL subframes or the DL subframes to the MS. The BS may inform the MS of subframe allocation by using one MAP. Alternatively, the subframe allocation may be informed for each subframe.

Figure 8:
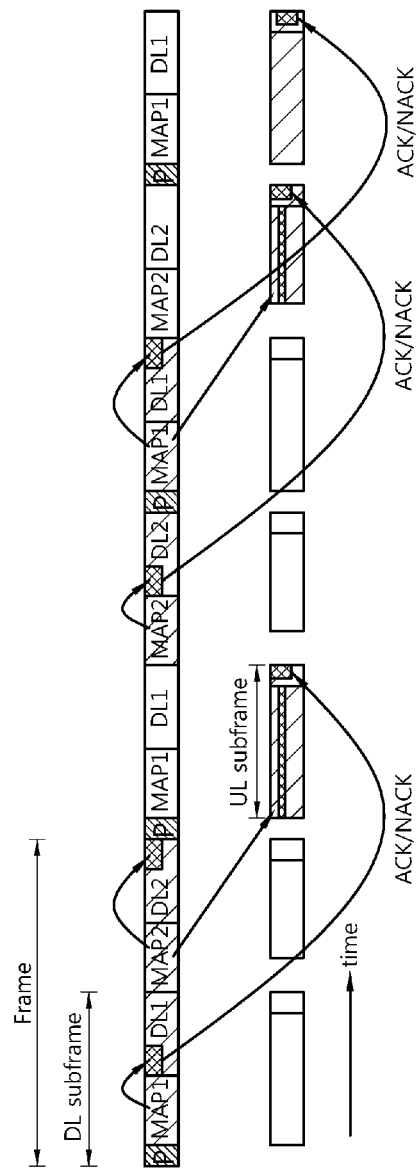
FIG. 8 shows an example of an operation of an MS in H-FDD mode.

FIG. 8 shows an example of an operation of an MS in H-FDD mode.

Referring to FIG. 8, a BS transmits a MAP message through DL transmission according to scheduling. The MS reads DL data through a DL data region indicated by a DL-MAP message. The MS transmits UL data through an allocated UL region only when UL radio resources for UL data transmission are allocated by a UL-MAP message. Other MSs always watch DL communication.

Examples of the UL data transmitted by the MS include DL channel information, acknowledgement (ACK)/negative-acknowledgment (NACK) for received DL data, etc.

If there is no UL data to be transmitted by the MS, the BS can continuously allocate DL subframes to the MS. Therefore, if the BS allocates a large DL data region to the MS, the DL data region can be allocated throughout the contiguous DL subframes. Likewise, if the UL subframes are continuously allocated and if the BS allocates a large UL data region to the MS, the UL data region can be allocated throughout the contiguous UL subframes.

Now, a method of allocating a DL subframe or a UL subframe in H-FDD mode will be described.

Figure 9:
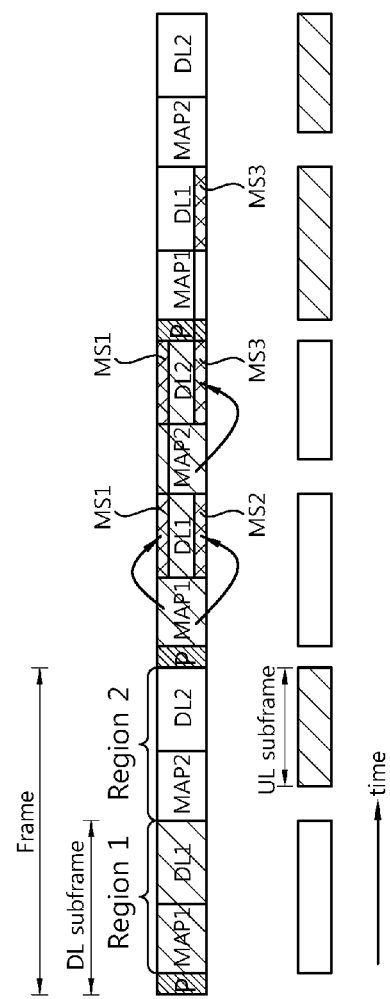
FIG. 9 shows a data region allocated throughout contiguous downlink (DL) subframes.

FIG. 9 shows a data region allocated throughout contiguous DL subframes.

Referring to FIG. 9, a BS allocates contiguous DL subframes to a first MS (i.e., MS1). If the BS allocates a large DL data region to the MS, DL data regions can be allocated throughout a plurality of contiguous DL subframes. For example, a MAP1 can allocate a DL data region of the MS1 to a first DL burst (DL1) and a second DL burst (DL2) throughout two contiguous subframes. Further, the MAP1 can allocate a DL burst of a second MS (i.e., MS2) by excluding the regions allocated to the MS1.

A MAP2 allocates a DL burst of a third MS (i.e., MS3) throughout two contiguous subframes.

Although a DL burst is allocated using a DL-MAP in a DL subframe in the above descriptions, those skilled in the art can easily apply this method to a case where a UL burst is allocated using a UL-MAP.

Figure 10:
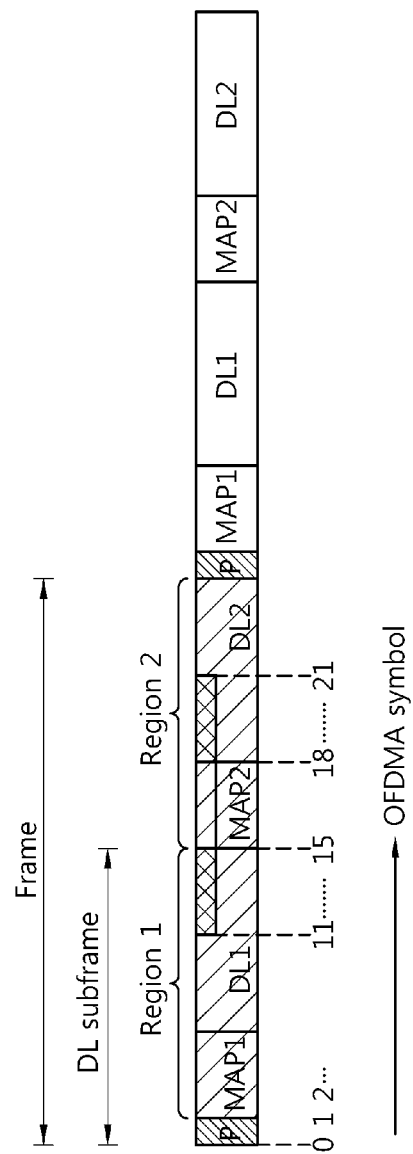
FIG. 10 shows an example of a method of allocating a DL data region.

FIG. 10 shows an example of a method of allocating a DL data region.

Referring to FIG. 10, when a DL-MAP message is transmitted using a MAP1 of a region 1, the DL-MAP message indicates a DL data region allocated throughout the region 1 to a region 2. The DL data region is represented with an OFDMA symbol offset, a subchannel offset, the number of OFDMA symbols (i.e., 'No. OFDMA symbols') and the number of subchannels (i.e., 'No. subchannels'). The OFDMA symbol offset is an offset of an OFDMA symbol at which the DL data region starts. The subchannel offset is a lowest index of a subchannel for transmitting DL data. The 'No. OFDMA symbols' is the number of OFDMA symbols used for DL data transmission. The 'No. subchannels' is the number of subchannels used for DL data transmission. The 'No. OFDMA symbols' may or may not include a MAP2.

For example, in one embodiment of FIG. 10, a data region is allocated throughout OFDMA symbol indices 11 to 14 in the region 1 and throughout OFDMA symbol indices 18 to 20 in the region 2. The MAP 2 of the region 2 is allocated throughout OFDMA symbol indices 15 to 17. In this case, an OFDMA symbol offset is 11. The 'No. OFDMA symbols' may be represented with an offset 9 by including the MAP2 region or may be represented with an offset 6 by excluding the MAP2 region. However, this is not limited thereto, and thus the DL data region can be represented in various manners by those skilled in the art. Since the MAP2 region is known to an MS, the MS can read a DL data region allocated to the MS by excluding the MAP2 region.

This can also apply to a case where a UL data region is allocated throughout contiguous UL subframes. A UL-MAP message transmitted through the MAP1 of the region 1 indicates a UL data region allocated throughout the contiguous UL subframes. The UL-MAP message also represents the UL data region by using an OFDMA symbol offset, a subchannel offset, a 'No. OFDMA symbols' and a 'No. subchannels'.

Figure 11:
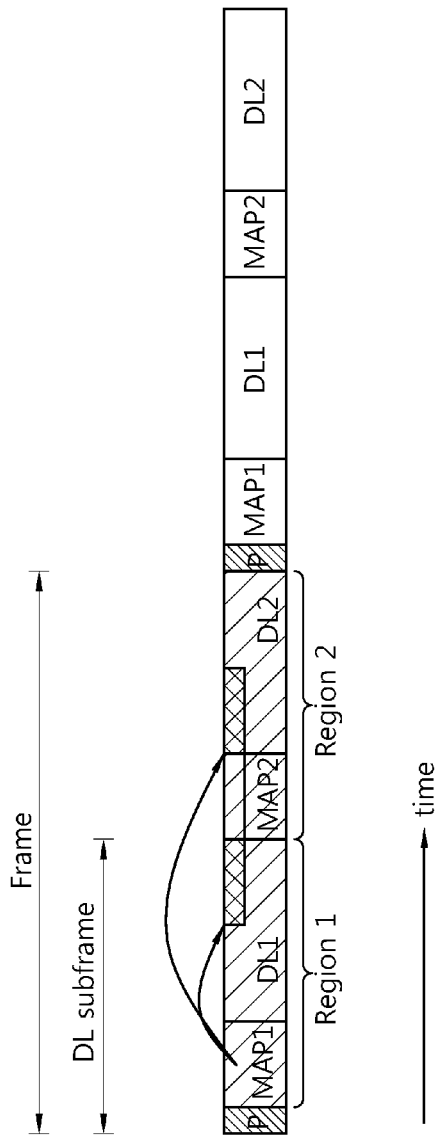
FIG. 11 shows another example of a method of allocating a DL data region.

FIG. 11 shows another example of a method of allocating a DL data region.

Referring to FIG. 11, a MAP1 allocates DL data regions to an MS by separating a DL data region included in a region 1 and a DL data region included in a region 2. Since the MAP1 indicates each of the DL data region included in the region 1 and the DL data region included in the region 2, it is possible to avoid an overhead that occurs when the MS reads the DL data regions by excluding a MAP2 region. This can also apply to a case where a UL data region is allocated throughout contiguous UL subframes.

Figure 12:
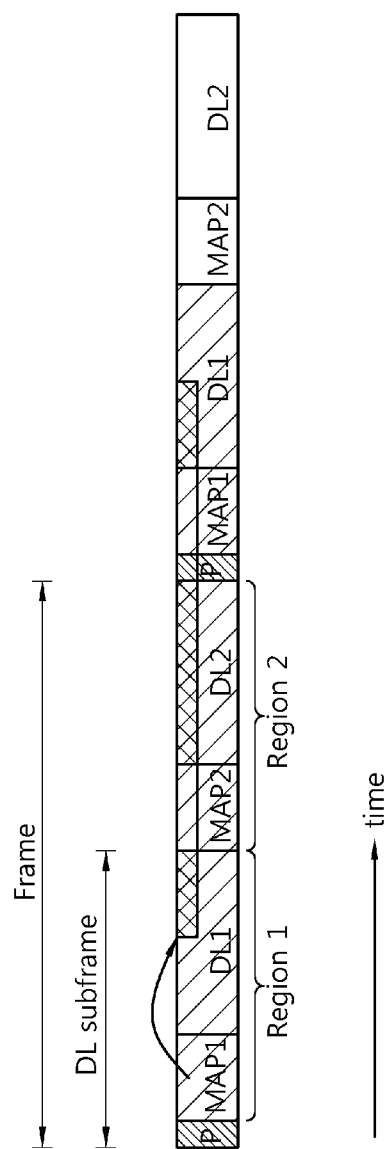
FIG. 12 shows still another example of a method of allocating a DL data region.

FIG. 12 shows still another example of a method of allocating a DL data region.

The DL data region can be allocated throughout a plurality of contiguous DL subframes. In this case, regions (i.e., a preamble, a MAP1, a MAP2, etc.) included between continuously allocated regions are excluded in allocation as in the case of the MAP2 region explained with reference to FIG. 10 or FIG. 11. That is, an MS may read DL data regions by excluding regions other than allocated DL data regions or may know a DL data region for each DL subframe using the MAP. This may also apply to a case where a UL data region is allocated throughout contiguous UL subframes.

Figure 13:
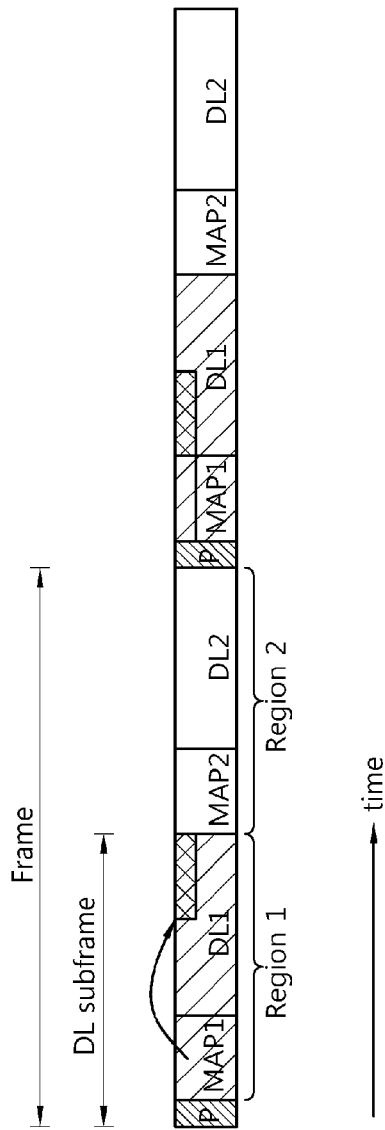
FIG. 13 shows still another example of a method of allocating a DL data region.

FIG. 13 shows still another example of a method of allocating a DL data region.

Even when a BS does not continuously allocate DL subframes to an MS, the BS can allocate to the MS a DL data region beyond one DL subframe. The MS can read a DL data region allocated to the MS by excluding a region 2 not allocated to the MS. This may also apply to a case where a UL data region is allocated throughout contiguous UL subframes.

The method of allocating DL and UL subframes to an MS in H-FDD mode has been described above. However, since a broadcast/multicast message cannot be received while the MS transmits the UL subframe in H-FDD mode, there is a need for a method of transmitting the broadcast/multicast message to the MS.

The broadcast/multicast message is a DL message transmitted by a BS to all MSs within a cell. The multicast message is a DL message transmitted by the BS to a plurality of MSs within the cell. The broadcast message includes system information or physical channel characteristics, and provides the MS with general information for communication with the BS. Examples of the broadcast message include a downlink channel descriptor (DCD) message, an uplink channel descriptor (UCD) message, a neighbor advertisement (MOB_NBR-ADV) message, etc.

Figure 14:
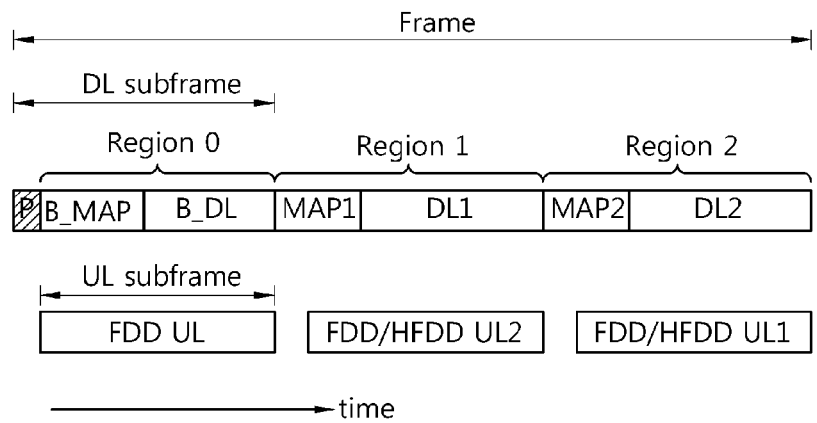
FIG. 14 shows an example of a frame structure for transmitting a broadcast/multicast message.

FIG. 14 shows an example of a frame structure for transmitting a broadcast/multicast message.

Referring to FIG. 14, one frame includes a DL subframe for transmitting a broadcast or multicast message. For example, a DL subframe for transmitting the broadcast message is referred to as a region 0. The region 0 includes a broadcast MAP (B_MAP) and a broadcast DL burst (B_DL).

The B_MAP is a region for transmitting a broadcast MAP message. The broadcast MAP message defines access to a channel for transmitting the broadcast message. The B-DL is a region for transmitting the broadcast message.

In case of using FDD mode, an MS can receive a DL channel while transmitting a UL channel, and thus a UL subframe can be allocated during the same time period as the region 0. However, in case of using H-FDD mode, the MS cannot receive the DL channel while transmitting the UL channel. Therefore, the MS cannot be allocated with a UL subframe based on H-FDD mode during the same time period as the region 0. The region 0 may be always present or may be present only when the broadcast message exits. The position of the region 0 is not limited. Thus, the region 0 may be located in any positions, such as, ahead of the region 1, behind of the region 2, or between the region 1 and the region 2.

Figure 15:
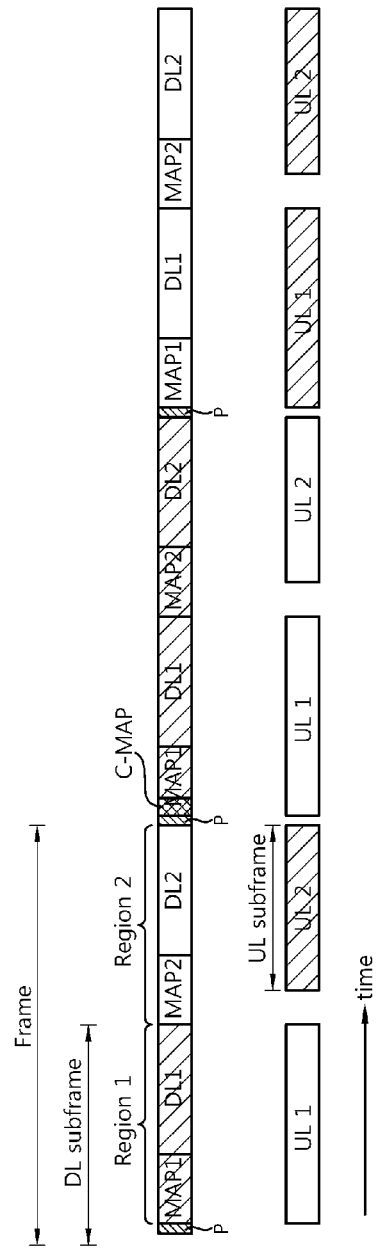
FIG. 15 shows another example of a frame structure for transmitting a broadcast/multicast message.

FIG. 15 shows another example of a frame structure for transmitting a broadcast/multicast message.

Referring to FIG. 15, a DL subframe includes a common MAP (C-MAP). The C-MAP defines resource allocation for the broadcast/multicast message which is a DL message for a plurality of MSs. The C-MAP message defines access to a channel for transmitting the broadcast/multicast message. The C-MAP may define resource allocation for a DL burst including the broadcast/multicast message or may define resource allocation for a MAP of a DL burst including the broadcast/multicast message. The MSs within a cell can read the broadcast/multicast message according to the C-MAP.

The C-MAP may be located between a preamble and a MAP1. However, the location of the C-MAP is not limited thereto. Thus, the C-MAP may be located between a first DL burst (DL1) and a MAP2.

A frame including the C-MAP may be transmitted either periodically or non-periodically.

A case of periodically transmitting the frame including the C-MAP will be first described. A DL subframe including the C-MAP can be transmitted once every N subframes (N≧1). The broadcast/multicast message may be transmitted or not transmitted. If the broadcast/multicast message is not transmitted, there is no need to decode the C-MAP. For this, the C-MAP may include an indication bit. The indication bit indicates whether the broadcast/multicast message is transmitted or not. For example, if the indication bit is '0B1', the broadcast/multicast message is transmitted, and if the indication bit is '0b0', the broadcast/multicast message is not transmitted. In this case, the C-MAP is entirely decoded only when the indication bit is '0b1'. When the indication bit is '0b0', the C-MAP located behind the indication bit may not be decoded.

Now, a case of non-periodically transmitting a frame including the C-MAP will be described. According to one embodiment, the frame including the C-MAP is transmitted only when the broadcast/multicast message is transmitted. Therefore, if the broadcast/multicast message is transmitted, a preamble may be followed by the C-MAP. If the broadcast/multicast message is not transmitted, the preamble may be immediately followed by a MAP1. According to another embodiment, an FCH may be used to indicate whether a subsequent frame includes the C-MAP. That is, information indicating transmission of the C-MAP is carried on the FCH included in a subframe which is located in a previous position of a subframe at which the C-MAP is transmitted. Table 4 below shows an example of the FCH.

TABLE 4

| Syntax | Size (bit) | Notes |
|---|---|---|
| DL Frame Prefix Format( ){ | — | |
|     C-MAP_Indication | 1 | 0b0: No Common MAP |
|  |  | 0b1: Common MAP |
|     Coding Indication | 3 | — |
|     DL-MAP Length | 8 | — |
|     Reserved | 4 | |
| } | | |

The FCH includes a DL-MAP coding scheme (Coding_indication), a DL-MAP message length (DL-MAP_Length), and a C-MAP indication (C-MAP_Indication). The C-MAP indication indicates whether a subsequent FDD frame includes the C-MAP. If a MAP type value is '0b0', the subsequent FDD frame does not include the C-MAP. If the MAP type value is '0b1', the subsequent FDD frame includes the C-MAP. The C-MAP indication may be specified by a reserved 4-bit field.

According to still another embodiment, the DL-MAP may be used to indicate whether the subsequent frame includes the C-MAP. That is, information indicating transmission of the C-MAP is carried on the DL-MAP included in a subframe which is located in a previous position of a subframe at which the C-MAP is transmitted.

The C-MAP is a dedicated MAP that defines resource allocation for transmission of the broadcast/multicast message. Therefore, the C-MAP can be used not only for H-FDD mode but also for FDD or TDD mode.

Figure 16:
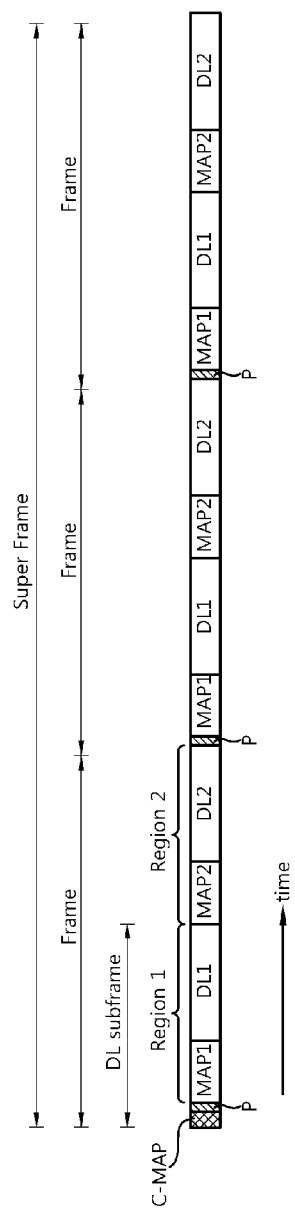
FIG. 16 shows an example of a super-frame structure for transmitting a broadcast/multicast message.

FIG. 16 shows an example of a super-frame structure for transmitting a broadcast/multicast message.

Referring to FIG. 16, a super-frame includes a C-MAP and N frames. The C-MAP may be located at a first portion of the super-frame.

The super-frame is similar to the case of FIG. 15 in which the frame including the C-MAP is periodically transmitted. All MSs within a cell can read the broadcast message by using the C-MAP. If the broadcast message is not transmitted, it is not necessary to decode the entire C-MAP message. For this, the C-MAP message of the super-frame may include an indication bit.

Accordingly, a frame structure for effectively implementing FDD and/or H-FDD mode is provided, and thus efficiency of data transmission can be improved using the frame structure. In addition, radio resources can be effectively allocated in H-FDD mode.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for communication of a mobile station (MS) in wireless communication system, the method comprising:
transmitting a basic capability request message, indicating whether the MS supports a half-frequency division duplex (H-FDD) or a full-frequency division duplex (F-HDD) to the base station (BS);
receiving a basic capability response message which is a response for the basic capability request message from the BS, wherein the basic capability response message indicates the half-frequency division duplex (H-FDD) or a full-frequency division duplex (F-HDD),
receiving a group switching indicator, indicating a group from a first group and a second group, from a base station (BS) when the basic capability response message indicates the H-FDD, and
switching to the group indicated by the group switching indicator when the group indicated by the group switching indicator is not equal to a current group,
wherein a downlink (DL) frame contains two DL subframes, the two DL subframes being located in the order of a first DL subframe and a second DL subframe, and an uplink (UL) frame contains two UL subframes, the two UL subframes being located in the order of a second UL subframe and a first UL subframe, and
wherein if a switched group according to the switching is the first group, the MS receives a signal in the first DL subframe and transmits a signal in the first UL subframe, and
if the switched group is the second group, the MS receives a signal in the second DL subframe and transmits a signal in the second UL subframe.

2. The method of claim 1, wherein the first DL subframe is not overlapped with the first UL subframe.

3. The method of claim 2, wherein the second DL subframe is not overlapped with the second UL subframe.

4. The method of claim 1, wherein the first DL subframe and the second DL subframe uses different frequency band from the first UL subframe and the second UL subframe.

5. The method of claim 1, wherein the first DL subframe comprises a preamble, a first MAP region and a first data region and the second DL subframe comprises a second MAP region and a second data region.

6. The method of claim 5, wherein the group switching indicator is received in the first MAP region or in the second MAP region.

7. The method of claim 1, wherein when the group switching indicator is received in DL frame n (n is an integer number), the switching is performed in DL frame n+2.

8. A mobile station (MS), the MS comprising:
a radio frequency (RF) unit for transmitting and receiving a radio signal; and
a processor coupled with the RF unit and configured to transmit a basic capability request message, indicating whether the MS supports a half-frequency division duplex (H-FDD) or a full-frequency division duplex (F-HDD) to the base station (BS);

receive a basic capability response message which is a response for the basic capability request message from the BS, wherein the basic capability response message indicates the half-frequency division duplex (H-FDD) or a full-frequency division duplex (F-HDD), receive a group switching indicator, indicating a group from a first group and a second group, from a base station (BS) when the basic capability response message indicates the H-FDD, and switch to the group indicated by the group switching indicator when the group indicated by the group switching indicator is not equal to a current group, wherein a downlink (DL) frame contains two DL subframes, the two DL subframes being located in the order of a first DL subframe and a second DL subframe, and an uplink (UL) frame contains two UL subframes, the two UL subframes being located in the order of a second UL subframe and a first UL subframe, and wherein if a switched group according to the switching is the first group, the MS receives a signal in the first DL subframe and transmits a signal in the first UL subframe, and if the switched group is the second group, the MS receives a signal in the second DL subframe and transmits a signal in the second UL subframe.

9. The MS of claim 8, wherein the first DL subframe is not overlapped with the first UL subframe.

10. The MS of claim 9, wherein the second DL subframe is not overlapped with the second UL subframe.

11. The MS of claim 8, wherein the first DL subframe and the second DL subframe uses different frequency band from the first UL subframe and the second UL subframe.

12. The MS of claim 8, wherein the first DL subframe comprises a preamble, a first MAP region and a first data region and the second DL subframe comprises a second MAP region and a second data region.

13. The MS of claim 12, wherein the group switching indicator is received in the first MAP region or in the second MAP region.

14. The MS of claim 8, wherein when the group switching indicator is received in DL frame n (n is an integer number), the switching is performed in DL frame n+2.

* * * * *